US009009353B1

(12) United States Patent
Donley et al.

(10) Patent No.: US 9,009,353 B1
(45) Date of Patent: Apr. 14, 2015

(54) SPLIT NETWORK ADDRESS TRANSLATION (71) Applicant: Cable Television Laboratories, Inc., Louisville, CO (US)

(72) Inventors: Chris Donley, Broomfield, CO (US); Chris Grundemann, Denver, CO (US); James Kim, Erie, CO (US); Jun Tian, Sunnyvale, CA (US); Karthik Sundaresan, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/250,829

(22) Filed: Apr. 11, 2014

(51) Int. Cl.
G06F 15/16 (2006.01)
H04L 29/06 (2006.01)
H04L 29/12 (2006.01)

(52) U.S. Cl.
CPC ............ *H04L 69/167* (2013.01); *H04L 61/256* (2013.01); *H04L 61/2521* (2013.01); *H04L 61/251* (2013.01)

(58) Field of Classification Search
CPC ........ H04L 69/167; H04L 29/1233–29/12556; H04L 61/25–61/2585
USPC .......................... 709/213, 236, 245–246, 249
See application file for complete search history.

(56) References Cited

U.S. PATENT DOCUMENTS

| | | | | |
|---|---|---|---|---|
| 6,331,984 B1* | 12/2001 | Luciani | ......................... | 370/401 |
| 6,691,165 B1* | 2/2004 | Bruck et al. | .................. | 709/227 |
| 7,853,680 B2* | 12/2010 | Phatak | .......................... | 709/223 |
| 7,908,386 B2* | 3/2011 | Gotare et al. | ................. | 709/227 |
| 8,170,014 B1* | 5/2012 | Metz et al. | ..................... | 370/389 |
| 8,289,968 B1* | 10/2012 | Zhuang | ........................ | 370/392 |
| 8,572,255 B2* | 10/2013 | Rice | ............................ | 709/227 |
| 2003/0086422 A1* | 5/2003 | Klinker et al. | ................ | 370/389 |
| 2004/0215752 A1* | 10/2004 | Satapati et al. | ............... | 709/223 |
| 2006/0259625 A1* | 11/2006 | Landfeldt et al. | ............. | 709/227 |
| 2007/0094411 A1* | 4/2007 | Mullane et al. | ............... | 709/245 |
| 2007/0140128 A1* | 6/2007 | Klinker et al. | ................ | 370/238 |
| 2008/0225888 A1* | 9/2008 | Valluri et al. | ................. | 370/466 |
| 2010/0061380 A1* | 3/2010 | Barach et al. | ................. | 370/400 |
| 2010/0318665 A1* | 12/2010 | Demmer et al. | ............. | 709/227 |
| 2012/0303809 A1* | 11/2012 | Patel et al. | .................... | 709/225 |
| 2013/0185404 A1* | 7/2013 | Patel et al. | .................... | 709/222 |

* cited by examiner

*Primary Examiner* — Patrice Winder
(74) *Attorney, Agent, or Firm* — Great Lakes Intellectual Property, PLLC.

(57) ABSTRACT

Network address translation of messages transported over an autonomous system between multiple network elements is contemplated. The network address translation may be performed by instructing one network element to translate upstream messages for a particular messaging paths and a different network element to translate downstream messages for the same messaging path, thereby providing split network address translation.

21 Claims, 4 Drawing Sheets

SPLIT NETWORK ADDRESS TRANSLATION

TECHNICAL FIELD

The present invention relates to translating addresses, such as but not limited to translation of Internet Protocol Version 4 (IPv4) and Internet Protocol Version 6 (IPv6) addresses.

BACKGROUND

Internet Protocol (IP) is a computer network protocol (analogous to written and verbal languages) that all machines on the Internet must know so that they can communicate with one another, i.e., IP is a layer 3 (network layer) protocol in the Open Systems Interconnection (OSI) model. The vast majority of IP devices support IP version 4 (IPv4) defined in Internet Engineering Task Force (IETF) request for comment (RFC) 791, the disclosure of which is hereby incorporated by reference in its entirety, and IP version 6 (IPv6) defined in RFC 2460, the disclosure of which is hereby incorporated by reference in its entirety. Devices relying on IP may be assigned an IP address (e.g., an IPv4 and/or an IPv6 address). In some cases, a device configured to support IPv4 may be unable to support IPv6, e.g., the device may be limited to processing messages having IPv4 addresses such that messages having IPv6 addresses are ignored. This can be problematic when it is desirable for the IPv4 dependent devices to interact with IPv6 dependent devices.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
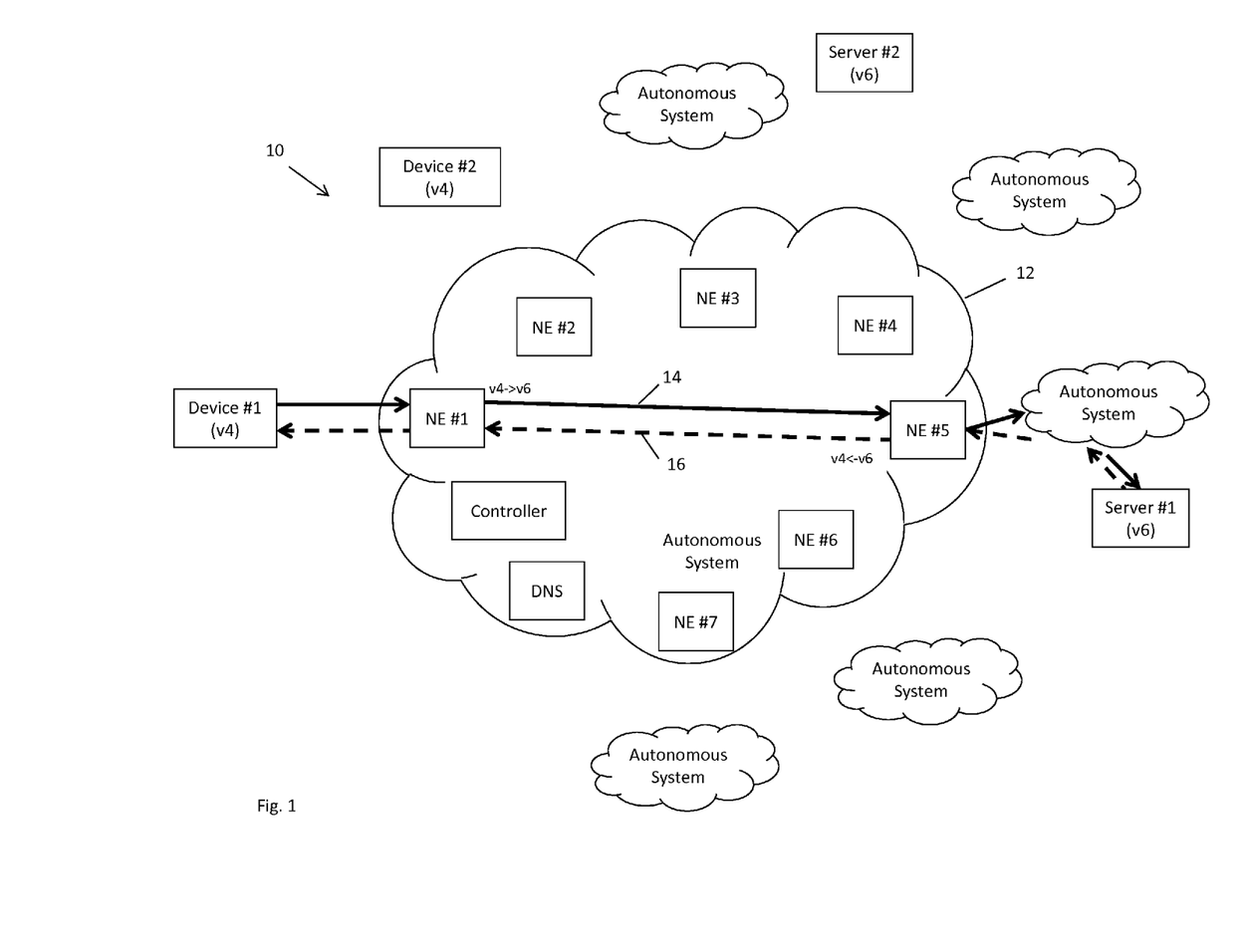
FIG. 1 illustrates a split-translation system in accordance with one non-limiting aspect of the present invention.

FIG. 1 illustrates a split-translation system 10 in accordance with one non-limiting aspect of the present invention. The system 10 illustrates a plurality of autonomous systems configured to facilitate signaling between a plurality of devices (two of which are labeled as servers). The autonomous systems may include a set of network elements (NEs) or other router-capable devices under a single technical administration, such as in the manner described in RFC 1930, the disclosure of which is hereby incorporated by reference in its entirety. The autonomous systems may facilitate communications (e.g., route packets) between the network elements according to an interior gateway protocol and common metrics and with other autonomous systems using an exterior gateway protocol. Each of the autonomous systems may be configured similarly to the illustrated one of the autonomous systems to include a plurality of network elements, a controller, a dynamic name system (DNS) and/or any number of other devices or features sufficient to facilitate the operations contemplated herein. FIG. 1 illustrates an exemplary scenario where the autonomous system 12 facilitates routing messages (packets) between a first device and a first server using split network address translation.

The split network address translation may correspond with translating addressing information or other packet-transported information included within exchanged messages at different locations, e.g., the first network element and the fifth network element. A first line 14 may correspond with a first message traveling in an upstream direction over a messaging path between the first device and the first server by way of the first network element and the fifth network element. A second line 16 may correspond with a second message traveling in a downstream direction over the messaging path from the first server to the first device by way of the fifth network element and the first network element. Optionally, additional hops or other devices (e.g., one or more of the other illustrated network elements and/or other non-illustrated devices) may facilitate transport of the first and second messages. The first and second network elements are shown to facilitate the first and second messages due to being the network elements closest to the first device and the first server, however, other network elements may have been similarly used without deviating from the scope of contemplation of the present invention. The selection of the two closest network elements to the two communicating devices as endpoints within the autonomous system 12 is believed to be beneficial in ameliorating signaling demands, particularly when wireless signaling is employed to facilitate the communications.

The network elements may include a translator (not shown) or translation capabilities sufficient to facilitate the contemplated translations, which for exemplary purposes are described with respect to facilitating translations necessary to enable communications between an Internet Protocol Version 4 (IPv4) limited device, such as the first device, and Internet Protocol Version 6 (IPv6) limited device, such as the first server. The IPv4 and IPv6 devices may correspond with one exemplary pair of devices configured to support a single version of a protocol or standard, and therefore being limited at least in so far as being unable to connect with a device supporting a different or later version of the protocol, at least in a manner sufficient to facilitate message exchanges necessary to establish a session or other communication medium between the devices. As noted above, IPv4 devices may ignore or otherwise disregard messages having IPv6 addresses as the destination address and/or the source address. The network elements having network address translation capabilities may be configured to facilitate translating messages between the IPv4 devices and IPv6 device in a manner sufficient to permit IP message exchange therebetween using split network address translation.

The system 10 is described with respect to supporting Internet Protocol (IP) based connections between the first device and the first server and/or similarly configured devices (such as the second device and the second server) where the network elements may be include a Carrier Grade Network Address Translator (CGN) that facilitates mapping network addressing, such as but not limited to the CGN described in U.S. patent application Ser. No. 13/232,509, the disclosure of which is hereby Incorporated by reference in its entirety. The CGN is described for exemplary non-limiting purposes as one type of Network Address Translator (NAT) operable to facilitate the contemplated address translations. The present invention, however, fully contemplates its use and application with any network element having sufficient network address translations capabilities and is not particular limited to a CGN type of translator. While the present invention fully contemplates the autonomous system facilitating communications non-dependent devices, for exemplary purposes, the description herein highlights one scenario where at least one of the devices is an IPv4-dependent device (i.e., unable to process IPv6 addressed messaging) and at least one the devices is an IPv6-dependent device (i.e., unable to process IPv4 addressed messaging).

The devices may be any device capable of supporting IP-based communications and/or connections. The devices for example, may be any type of terminal sufficient for rendering and/or providing electronic content, such as but not limited to a streaming server, a website, a set-top box (STB), a television, a computer (desktop, laptop, tablet, PDA, etc.), a mobile phone, a media terminal adapter (MTA), a digital video recorder (DVR), etc. The autonomous system 12 may rely on any type of electronic medium to transport signaling (packets, messages, etc.), including being any type of wireline or wireless network, or combination thereof, such as but not limited to a cable television network, a cellular network, a Wi-Fi network, an optical network, etc. The packets and/or other types of data carried over the autonomous system 12 may facilitate use of any type of electronic content suitable for electronic transmission, such as but not limited to video, audio, or some combination thereof. The devices may be associated with a service provider, for example, a cable television service provider, a broadcast television service provider, a satellite television service provider, a multiple system operator (MSO), a streaming video/audio server/service, a home media gateway and/or any other entity operable to facilitate the contemplated transmissions.

The controller may be configured in accordance with the present invention to facilitate regulating the transmissions carried out over the autonomous system, e.g., implementing the interior gateway protocol and/or the contemplated split network address translation. The controller may identify the network elements within the autonomous system 12 or those assigned to another autonomous system based on an autonomous system number (ASN) associated therewith and/or based on prefixes other addressing identifying information (elements within the same autonomous system may be assumed if operating within the same prefix range). The controller may communicate or possess the capability to communicate with any one or more of the network elements, the devices and/or or other non-illustrated intermediary devices to facilitate implementing the interior gateway protocol, provide instructions sufficient for directing travel of messaging through the autonomous system or to otherwise determine messaging paths 14, 16 created with the autonomous system 12 to facilitate transporting messages between the devices (e.g., in the event the network elements automatically implement the interior gateway protocol, the controller may monitor or otherwise assessed the paths created by the network elements).

The controller may be aware of different or multiple message paths, sessions, connections, etc. constructed to transport messages over the autonomous system between the various devices, and based on this information, instructed the network elements tasked with performing split network address translations (e.g., some network elements may relay or transport messages without being instructed to translate included addressing information). One non-limiting aspect of the present invention contemplates the controller including a computer-readable medium having non-transitory instructions stored thereon, operable with a corresponding processor, to facilitate instructing or otherwise controlling the autonomous system and/or the devices in communication therewith to facilitate split network address translation, e.g., translating related upstream and downstream messages at different locations. In this manner, the controller may leverage its awareness of system traffic with desired address translation points to facilitate managing resources.

One non-limiting aspect of the present invention contemplates the controller facilitating split network address translation using information communicated to the network elements according to any suitable protocol, such as but not necessary limited to OpenFlow (OF) described in Open Flow Specification (https://www.opennetworking.org/sdn-resources/onf-specifications/openflow), the disclosure of which is hereby incorporated by reference in its entirety. OF may be particular beneficial in facilitating the split network address translation as it may be useful in ameliorating the processing demands on each network element, e.g., the controller may include the logic, mapping and other processing intensive aspects of generating, identifying, storing and facilitating use of translated to/from addresses rather than requiring each network element to identify the translated to/from network addresses. An Open Flow controller may be configured to have complete knowledge of network topology to facilitate the contemplated network translations. OF or other suitable protocols may be used to facilitate split network address translation so that a single network element need not consume resources required to translate upstream and downstream messages (e.g., if a single device were required to support upstream and downstream messages that device would have to score twice as many translations and if it were only required to support translations in one direction). The ability to load-split the translations between multiple network elements may be beneficial in enabling network resources to be distributed on a dynamic basis according to processing demands on the network elements, e.g., rather than using the network elements closest to the communicating devices, additional network elements may be used depending on various operating characteristics.

The network address translations may be based at least in part on addressing information provided from the DNS. When one of the devices attempts to ascertain an address, such as by generating a DNS query with entry of a website address or other information, the controller and/or the DNS may respond with a corresponding record. The DNS record may be one of an A-type or an AAAA-type record, depending on whether the desired server is associated with an IPv4 address (A-type record) or an IPv6 address (AAAA-type record). The DNS record may be defined according to RFC 1035, RFC 1123, RFC 2181, and/or RFC 3596, the disclosures of which are hereby incorporated by reference in their entirety. While described with respect to identifying addressing information using DNS records, the present invention is not necessarily so limited and fully contemplates identifying IP and/or non-IP addresses according to other methods and protocols and it is not necessarily required that the addresses be specified in a record or other message issued in response to an inquiry from a requesting device, e.g., the translation operations contemplated by the present invention may be useful in advance or prior to receiving such requests whereby the translations may be performed on the addresses in anticipation of receiving such a request.

The controller may process the DNS record issued in response to the query and provide corresponding addressing information to the first device, and if necessary, to the split network elements tasked with performing any related address translations. The controller may include a database (not shown) or processing capabilities sufficient to identify devices having limited or incompatible addressing requirements, e.g., the IPv4 and IPv6 dependent devices. The controller may also include capabilities for determining the closest network elements and/or assessing processing loads or other operating conditions to facilitate determining the non-closest network elements to be used when supporting the network address translation. In the event network address translation is not required for certain DNS records, e.g., in the event one of the communicating devices includes dual stack capability, i.e., the ability to support both IPv4 an IPv6 communications, and/or in the event the communications are to occur between similar configured devices, i.e., between devices operating according to the same one of the IPv4 an IPv6 standards, the controller may assigning one or more of the network elements to be used in facilitating the associated communications. In this manner, the controller may include capabilities associated with implementing or commanding implementation of the various operations contemplated herein to facilitate split network address translation and other operations carried out over the autonomous network.

Figure 2:
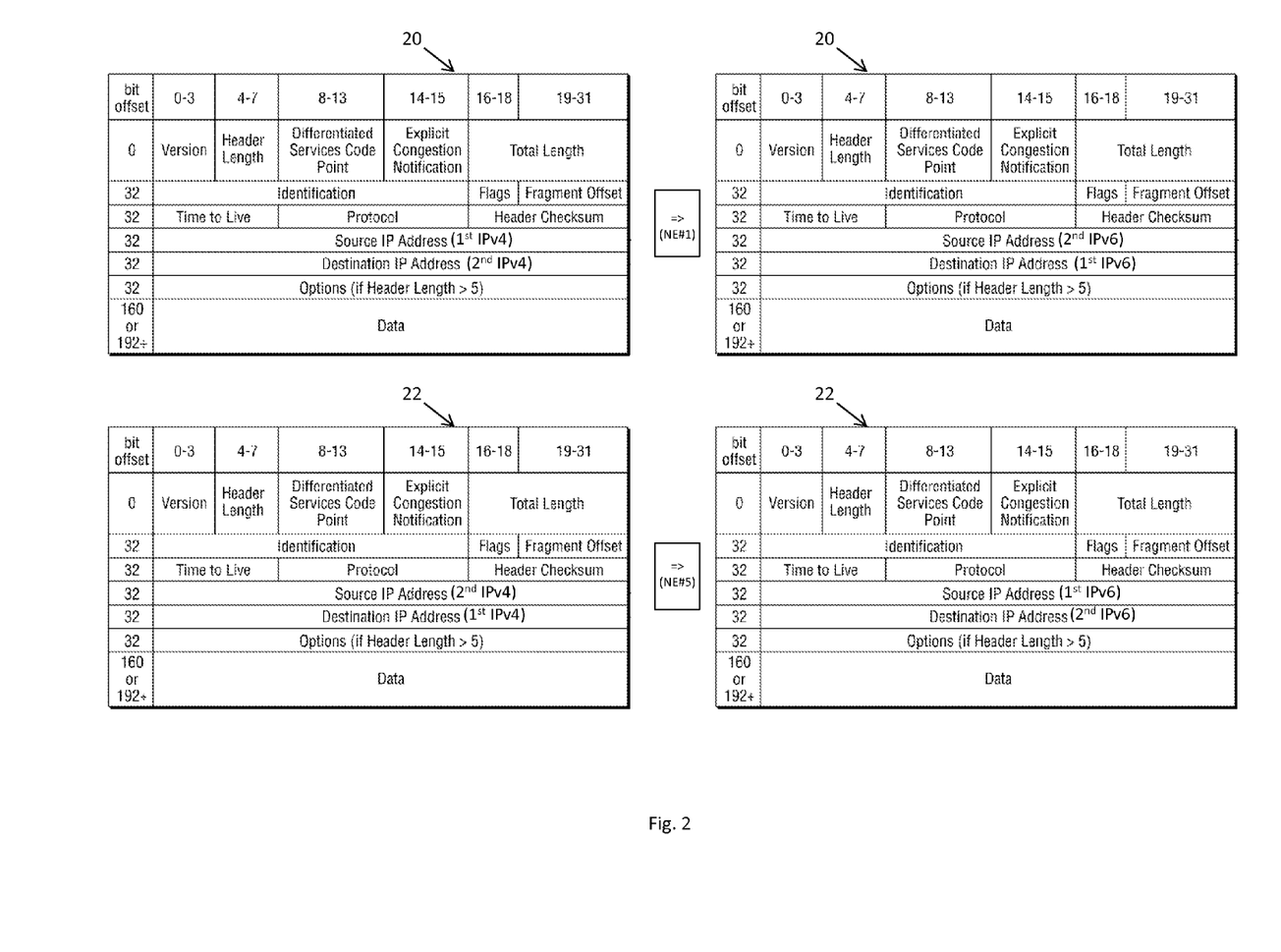
FIG. 2 illustrates message translation in accordance with one non-limiting aspect of the present invention.

FIG. 2 illustrates split translation of the first and second messages 20, 22 in accordance with one non-limiting aspect of the present invention. The first and second messages 20, 22 may be related in so far as being exchange between the first device and the first server as part of a transfer of data, such as that associated with downloading a website from the first server to the first device. The first and second messages 20, 22 may be exchanged as part of a transfer control protocol (TCP) session or connection where multiple messages are exchanged in order to facilitate transporting data between desired endpoints. The first message 20 is shown to be translated with the first network element and the second message 22 is shown to be translated with the fifth network element in order to comply with the illustration shown in FIG. 1. Similar translations of the first and second messages 20, 22 or other messages may be performed with another one or more of the network elements of the autonomous system 12 being used to facilitate a session, a connection or other related set of messaging between addressing-incompatible devices like the first device and the first server. While the present invention contemplates facilitating network address translation for any number reasons, the description herein is described for exemplary purposes with respect to facilitate network address translation when the first device attempts to download a webpage from the first server.

When attempting to download the webpage, the exemplary description presumes the first device is an IPv4 limited device and the first server is IPv6 limited device, however, the invention would similarly operate if the addressing limitations were be reversed and the first device was an IPv6 limited device and the first server was an IPv4 limited device. In the described example, the first device may be assigning a first IPv4 address ($1^{st}$ IPv4), such as part of a Dynamic Host Configuration Protocol (DHCP) assignment (controller, etc. may assign), such as that described in RFCs 2131 and 3315, the disclosures of which are hereby incorporated by reference in their entirety. The first device may use the first IPv4 address to issue an DNS query for a desired website, e.g., www.cablelabs.com, which may be intercepted or otherwise processed with the controller and/or DNS. A corresponding DNS record may be generated indicating the first server and a corresponding first IPv6 address ($1^{st}$ IPv6). The controller may process the DNS record and associate or otherwise assign a second IPv4 address ($2^{nd}$ IPv4) and a second IPv6 address ($2^{nd}$ IPv6) to be use in facilitating communications between the first device in the first server. Optionally, the controller may generate the second IPv4 address based on the first IPv6 address, such as by compressing the first IPv6 address into an IPv4 address in the manner described in U.S. patent application Ser. No. 13/288,334, the disclosure which is hereby for print by reference in its entirety. In this manner, the second IPv4 address may be used to compensate for the IPv4 limitations of the first device and the second IPv6 address may be used to compensate for the IPv6 limitations of the first server, i.e., to facilitate the translations occurring at the network elements associated with each of the first device in the first server.

The controller may generate a table or other database for relating the second IPv4 address and the second IPv6 address respectively with the first IPv4 address and the first IPv6 address, thereby providing a relation between the addressing originally assigned to the first device and the first server. The controller may provide corresponding instructions to the first network element and the fifth network element, such as using OF, in order to control translations performed thereon in response to receiving messages having the first and second IPv4 addresses and the first and second IPv6 addresses. As illustrated, the first message is translated at the first network element by replacing the first and second IPv4 addresses respectively identified as source and destination addresses with the first and second IPv6 addresses, thereby enabling the first message to be issued with IPv4 addresses according to the restrictions of the first device and to be subsequently translated to IPv6 addresses according to the restrictions of the first server. The second message or other messages with the combination of the first and second IPv6 addresses may be translated at the fifth network element by performing an inverse operation where the first and second IPv6 addresses respectfully identify the source and destination addresses are replaced with the first and second IPv4 addresses.

The controller may be configured to facilitate similar operations for additional messages desired to be transmitted over the autonomous system according to the IPv4 and IPv6 addresses associated with the corresponding source and destination. The use of OF or other messaging between the controller and the network elements may be beneficial in providing granular instructions to each network element with respect to their individual responsibility for translating messages (e.g., some network elements may be used as hops or other non-translating network elements in some cases such that they may ignore otherwise not perform translations for addresses assigned to be translated by other network elements). In particular, the present invention contemplates leveraging the capabilities of OF and similar instructional protocols to enable the controller or other suitable network element to facilitate dynamically splitting network address translation responsibilities across multiple network elements and/or to re-assign or otherwise allocate translation responsibilities depending on network performance, congestion, failure, etc. The translating network elements may be instructed to persistently translate messages according to the instructions provided from the controller, such as on a per-connection basis whereby multiple messages may be exchange between same endpoints (e.g., multiple messages may be exchanged between the first device in the first server in order to provide user access to desired services that the first device).

Figure 3:
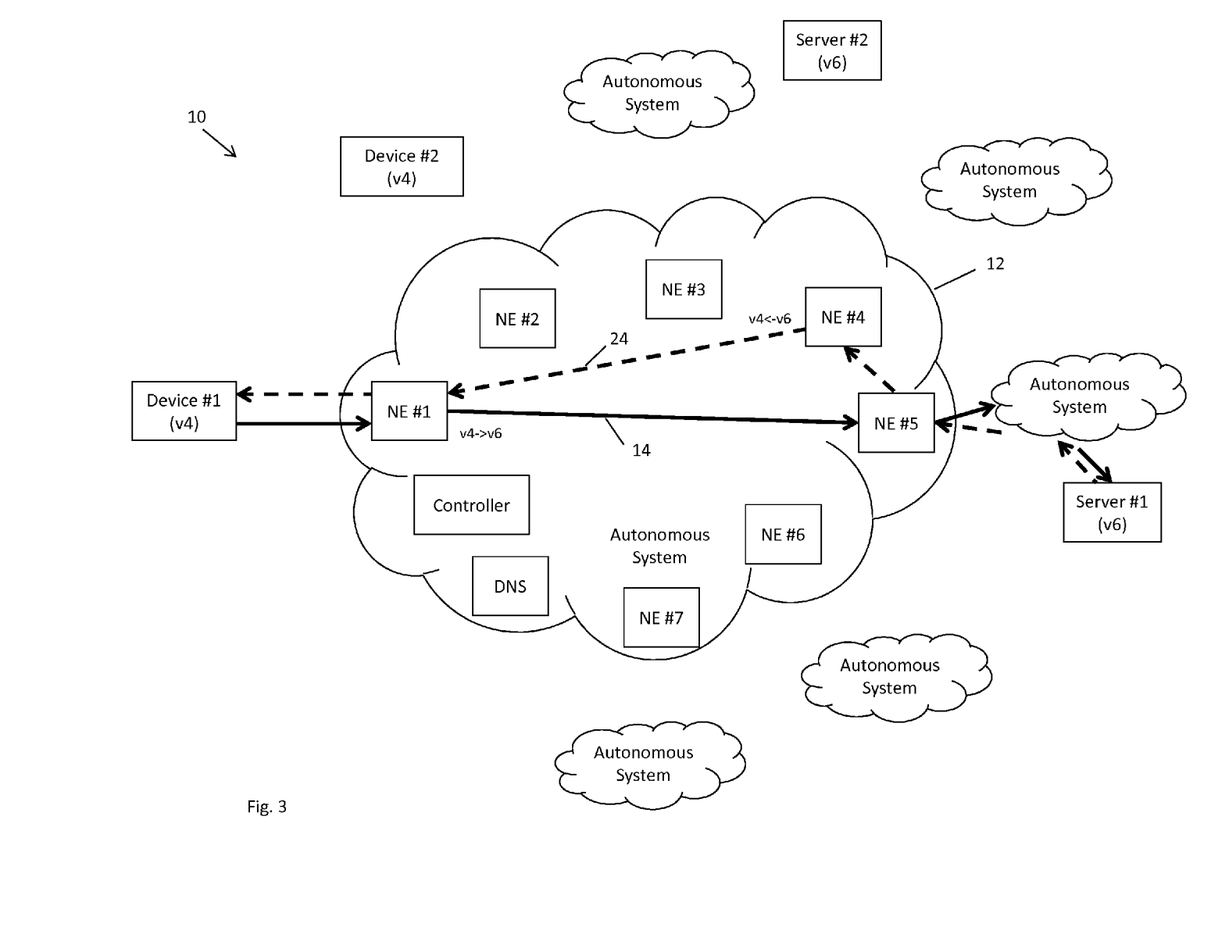
FIG. 3 illustrates the split-translation system performing load sharing in accordance with one non-limiting aspect of the present invention.

FIG. 3 illustrates the split-translation system 10 performing load sharing in accordance with one non-limiting aspect of the present invention. The load sharing may be characterized by instructing the fifth network element to rely upon the fourth network element to translate the second message under certain conditions, thereby creating a different path 24 for the second message. The load sharing may be beneficial when processing capabilities or CPU output exceeds a threshold (e.g., 80%), indicating it may be desirable to ameliorate further processing demands by relying upon another network element, and/or in the event a payload of the second message or other message would be more desirable to process at another network element, e.g., in the event VoIP capabilities of the fifth network element lack the application layer gateway (ALG) or other capabilities necessary to facilitate processing VoIP related packets, those packets may be forwarded to another network element having sufficient capabilities. Any other one of the network elements included as part of the autonomous system 12 may be similarly used in the place or in addition to the fourth network element. One-limiting aspect of the present invention contemplates limiting the network elements assigned to perform the split network address translation to those within the same autonomous system as the control of those network elements would fall under the domain of a common technical administration (the controller), which may be beneficial in ensuring proper network translations. The present invention is not necessarily so limited and fully contemplates facilitating split network address translation across network elements associated with different autonomous systems.

Figure 4:
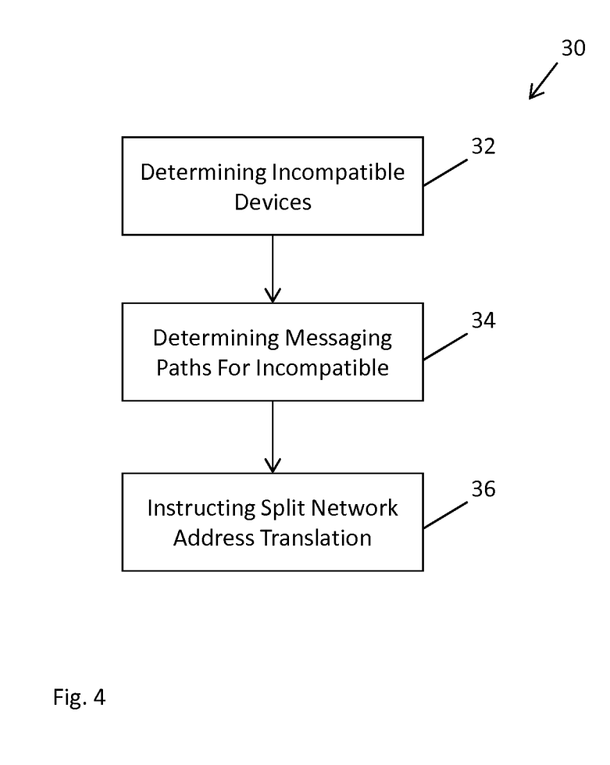
FIG. 4 illustrates a flowchart of a method for split network address translation in accordance with one non-limiting aspect of the present invention.

FIG. 4 illustrates a flowchart 30 of a method for split network address translation in accordance with one non-limiting aspect of the present invention. The method may be embodied in a computer-readable medium having instructions stored therein that when operated with a processor or other functioning feature facilitate executing the translation and other operations contemplated by the present invention. The method for exemplary non-limiting purposes is predominately described with respect to translating addresses identified as part of a DNS process where an IPv4 limited device (first device) originates a DNS inquiry in order to connect to an IPv6 limited device (first server) or vice versa where an IPv6 limited device issues a DNS query for or otherwise attempts to reach an IPv4 limited device. While the present invention is described with respect to a DNS-based process, the present invention is not necessarily limited to DNS and fully contemplates its use and application in any environment and with any messaging process where it may be desirable to translate IP and/or non-IP addresses such as streaming video from an IPv6-only video service provider connecting to a subscriber BluRay player that only supports IPv4.

Block 32 relates to determining incompatible devices based on a DNS query or other requests issued from an originating device to message with a destination device. An originating device may issue a DNS query or other inquiry using a universal resource locator (URL) in an attempt to message with the destination device associated therewith. The DNS query may generate a DNS record indicating addressing requirements of the destination device to be one of IPv4 and IPv6. The protocol addressing requirements of the destination device may be compared with the originating device to determine incompatibility, such as in the event the originating device requires IPv4 or IPv6 and the destination device requires the opposite one of IPv4 and IPv6. The requirements of the originating device may be determined for the purposes of adjudicating incompatibility based on addressing information included within the DNS query, i.e. the addressing or protocol requirements of the originating device may be assumed from the protocol used as a destination address within the DNS query. Of course, the present invention is that necessary so limited and fully contemplates determining addressing or other protocol requirements of the originating device through other means and mechanisms.

Block 34 relates to determining messaging paths for the incompatible devices. The messaging paths may correspond with a path created within the autonomous system, such as according to the interior gateway protocol, to facilitate messaging between the originating device and the destination device. The messaging paths are shown above to extend between at least two network elements where one network element is closer to the originating device and another network element is closer to the destination device. The upstream and downstream messaging paths are the same in FIG. 2 and different in FIG. 3 due to FIG. 3 illustrating a scenario where the downstream messaging path is diverted to an additional network due to processing restrictions of the network element closes to the destination device. Accordingly, Block 34 may include determining messaging paths on an upstream and a downstream basis or a path-by-path basis and identifying each network element being traversed and/or having network address translation capabilities (some of the network elements or intermediary elements may lack capabilities sufficient to facilitate network address translation).

Block 36 relates to the controller providing OF instructions or other suitable instructions to at least two different network elements within a messaging path associated with the incompatible devices. The instructions may be sufficient for instructing translation operations to be performed at the network elements in order to accommodate protocol or addressing incompatibility of the originating and destination devices. The translations may be performed in the manner described above where source and destination addresses included within received messages are translated to different source and destination addresses according to the addressing requirements of the upstream or downstream device intended to eventually receive the corresponding message. One non-limiting aspect of the present invention contemplates instructing no more than two of the network elements within each incompatible path to translate messages, optionally with the upstream translating network element being the network element closest to the device originating the corresponding upstream message and the downstream translating network element being the network element closest to the device originating the corresponding downstream message. Of course, the present invention is not necessary so limited fully contemplates the use of a single path (e.g., one of the upstream and downstream paths) and/or the use of network elements other than the closest network elements to facilitate address translations, particularly when load sharing is employed.

As supported above, one non-limiting aspect of the present invention relates to enabling IPv4-IPv6 translation, and distributing the translation duties across two or more network elements. When a subscriber with IPv4-only connectivity wants to connect to an IPv6-only content source, the subscriber initiates an DNS request. The network element (e.g., cable modem termination system (CMTS)) may then forward the DNS traffic to the OpenFlow (OF) Controller. The OF Controller checks with a special application that queries DNS. The application sees an AAAA record, which indicates that only IPv6 is available, so it initiates NAT46 translation. The application sends a special DNS A record response with a well-known public address (e.g. OFC IPv4 address, 100.64.112.0/12, etc.). Then the application, working through the OF Controller, instructs the network element to rewrite IPv4 source & destination addresses to IPv6 Source & Destination addresses, as follows:

Source: MSO-NAT46 prefix (/96)+IPv4 source address
Destination: "real" IPv6 destination address In the downstream direction, a second OF Network Element (e.g., router, switch) sends the incoming IPv6 flow to the OF Controller. Since the destination address is set to the MSO-CGN IPv4-embedded IPv6 address described above, the CGN application instructs the Network Element to rewrite the IP header, as follows:

Source: Well-known MSO public NAT46 address described above (e.g. OFC IPv4 address, 100.64.112.0/12, etc.)

Destination: "real" host IPv4 address (embedded inside IPv6 address)

This approach also allows for traffic initiated in the downstream direction. The subscriber, MSO, and/or dynamic DNS provider (e.g., Dyn.com) simply publishes a DNS AAAA record for the subscriber IPv4-embedded IPv6 address. The translation occurs as above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of instructions, operable with a processor of a controller, sufficient to facilitate translation of Internet Protocol version 4 (IPv4) and Internet Protocol version 6 (IPv6) addresses within an autonomous system, the autonomous system including a plurality of network elements arranged at various edge locations to facilitate exchanging messages with a plurality of devices, the network elements being configured to translate between IPv4 and IPv6 addresses as a function of instructions received from the controller, the computer-readable medium comprising instructions sufficient for:

determining a first Domain Name System (DNS) query originating from a first device of the plurality of devices, the first device having been previously assigned a first IPv4 address;

determining a first DNS record for the first DNS query, the first DNS record indicating a first IPv6 address for a first server outside of the autonomous system;

determining a first network element closest to the first device;

determining a second network element closest to the first server;

associating a second IPv4 address with the first IPv6 address;

associating a second IPv6 address with the first IPv4 address;

instructing the first network element to translate an upstream traveling first message originating from the first device for transfer over the autonomous system to the first server, the first message having the first IPv4 address as a first source address and the second IPv4 address as a first destination address, such that the first source address becomes the second IPv6 address and the first destination address becomes the first IPv6 address; and instructing the second network element to translate a downstream traveling second message originating from the first server for transport over the autonomous system to the first device, the second message having the first IPv6 address as a second source address and the second IPv6 address as a second destination address, such that the second source address becomes the second IPv4 address and the second destination address becomes the first IPv4 address;

instructing the second network element to relay the first message without address translation of the first and second IPv6 addresses; and instructing the first network element to relay the second message without address translation of the first and second IPv4 addresses.

2. The non-transitory computer-readable medium of claim 1 further comprising instructions sufficient for:

determining a load on the second network element;

instructing the second network element to relay a third message having the first and second IPv6 addresses respectively as source and destination addresses to a third network element without translating the first and second IPv6 addresses if the load is greater than a threshold, the third network element then translating the third message for transmission to the first network element, including translating the second IPv6 address to the first IPv4 address and the first IPv6 address to the second IPv4 address.

3. The non-transitory computer-readable medium of claim 2 further comprising instructions sufficient for instructing the second network element to translate the third message for transmission to the first network element if the load is less than the threshold, including translating the second IPv6 address to the first IPv4 address and the first IPv6 address to the second IPv4 address.

4. The non-transitory computer-readable medium of claim 1 further comprising instructions sufficient for:

instructing the second network element to relay a third message having the first and second IPv6 addresses respectively as source and destination addresses to a third network element without translating the first and second IPv6 addresses if the third message includes a payload of a first type, the third network element then translating the third message for transmission to the first network element, including translating the second IPv6 address to the first IPv4 address and the first IPv6 address to the second IPv4 address and translating the payload from the first type to a second type.

5. The non-transitory computer-readable medium of claim 1 further comprising instructions sufficient for querying a Dynamic Host Configuration Protocol (DHCP) server for the first DNS record.

6. A non-transitory computer-readable medium having a plurality of instructions, operable with a processor of a controller, sufficient to facilitate translation of Internet Protocol version 4 (IPv4) and Internet Protocol version 6 (IPv6) addresses within an autonomous system, the autonomous system including a plurality of network elements arranged at various edge locations to facilitate exchanging messages with a plurality of devices, the network elements being configured to translate between IPv4 and IPv6 addresses as a function of instructions received from the controller, the computer-readable medium comprising instructions sufficient for:

determining a first Domain Name System (DNS) query originating from a first device of the plurality of devices, the first device having been previously assigned a first IPv4 address;

determining a first DNS record for the first DNS query, the first DNS record indicating a first IPv6 address for a first server outside of the autonomous system;

determining a first network element closest to the first device;

determining a second network element closest to the first server;
associating a second IPv4 address with the first IPv6 address;
associating a second IPv6 address with the first IPv4 address;
instructing the first network element to translate an upstream traveling first message originating from the first device for transfer over the autonomous system to the first server, the first message having the first IPv4 address as a first source address and the second IPv4 address as a first destination address, such that the first source address becomes the second IPv6 address and the first destination address becomes the first IPv6 address; and
instructing the second network element to translate a downstream traveling second message originating from the first server for transport over the autonomous system to the first device, the second message having the first IPv6 address as a second source address and the second IPv6 address as a second destination address, such that the second source address becomes the second IPv4 address and the second destination address becomes the first IPv4 address;
instructing the second network element to relay the first message without translating the first source and destination addresses such that source and destination address translation of the first message only occurs at the first network element;
instructing the first network element to relay the second message without translating the second source and destination addresses such that source and destination address translation of the second message only occurs at the second network element; and
wherein the first and second messages are exchanged between the first device and the first server as part of a transfer control protocol (TCP) session, whereby the translation of the first message at the first network element and the translation of the second message at the second network element characterizes the TCP session as having split network address translation.

7. The non-transitory computer-readable medium of claim 1 further comprising instructions sufficient for determining the second IPv4 address by:
compressing an entirety of the first IPv6 address into a compressed expression, the first IPv6 address comprising a first number of binary bits and the compressed expression comprising a second number of binary bits, the second number being less than the first number;
selecting an available IPv4 address prefix; and
adding the selected IPv4 address prefix to the compresses compressed expression to form the second IPv4 address, the second IPv4 address being valid for IP-based communications.

8. A method of translating network addresses for a plurality of messages being transported within an autonomous system between an Internet Protocol (IP) version 4 (IPv4) dependent device and an IP version 6 (IPv6) dependent device as part of a session, the IPv4 dependent device being referred to hereinafter as a first device and the IPv6 dependent device being referred to herein after as a second device, the autonomous system including a plurality of network elements having network address translation capabilities, the plurality of network elements being operable according to a common interior gateway protocol, the method comprising:
instructing a first network element of the plurality network elements to translate addressing information included within one or more upstream messages, the one or more upstream messages being a corresponding one or more of the plurality of messages determined to be transported over the autonomous system in an upstream direction between the first and second devices;
instructing a second network element of the plurality network elements to translate addressing information included within one or more downstream messages, the one or more downstream messages being a corresponding one or more of the plurality of messages determined to be transported over the autonomous system in a downstream direction between the first and second devices;
instructing the first network element to relay the downstream messages without translation of the included addressing information; and
instructing the second network element to relay the upstream messages without translation of the included addressing information.

9. The method of claim 8 further comprising selecting the first network element to be the one of the plurality of network elements closest to the first device and selecting the second network element to be the one of the plurality of network elements closest to the second device.

10. The method of claim 8 further comprising selecting the first network element to be the one of the plurality of network elements closest to the first device and selecting the second network element to be one of the plurality network elements (next closest network elements) other than the one of the network elements closest to the second device (closest network element).

11. The method of claim 10 further comprising selecting the second network element to be the one of the next closest network elements closest to the closest network element having an application layer gateway (ALG), the closest network element not having an ALG.

12. The method of claim 8 further comprising:
determining a first address assigned to the first device and a second address assigned to the second device, the first address being one of a first IPv4 address and a first IPv6 address and the second address being the other one of the first IPv4 address and the first IPv6 address;
generating a third address for association with the first device, the third address being one of a second IPv4 address and a second IPv6 address, including associating the second IPv4 address with the first device if the first address is the first IPv4 address and associating the second IPv6 address with the first device if the first address is the first IPv6 address; and
generating a fourth address for association with the second device, the fourth address being the one of the second IPv4 address and the second IPv6 address not associated with the first device.

13. The method of claim 12 further comprising instructing the first network element to translate each upstream message having the first address as a first source address and the third address as a first destination address such that the first source address becomes the fourth address and the first destination address becomes the second address.

14. The method of claim 12 further comprising instructing the second network element to translate each downstream message having the second address as a first source address and the fourth address as a first destination address such that the first source address becomes the third address and the first destination address becomes the first address.

15. The method of claim 12 further comprising determining the second address based at least in part on a Dynamic Name System (DNS) query issued from the first device.

16. The method of claim 8 further comprising instructing the first and second network elements with instructions issued from a controller, the controller configured to generate the instructions according to OpenFlow (OF).

17. An autonomous system comprising:
a plurality of network elements having network routing and network address translation capabilities; and
a controller configured to:
i) determine messaging paths for each message transported between at least two network elements within the autonomous system;
ii) implement split network address translation for messages transported within messaging paths between devices having incompatible addressing requirements, including, on a path by path basis, instructing one of the network elements in the corresponding messaging path to translate upstream messages according to addressing requirements of a corresponding upstream device and a different one of the network elements in the corresponding messaging path to translate downstream messages according to addressing requirements of a corresponding downstream device
iii) instruct the one of the network elements to relay the downstream messages without translation of addressing previously translated with the different one of the network elements; and
iv) instruct the different one of the network elements to relay the upstream messages without translation of addressing previously translated with the one of the network elements.

18. The autonomous system of claim 17 wherein the controller is configured to transmit instructions to the network elements associated with implementing the split network address translation according to OpenFlow (OF).

19. The autonomous system of claim 17 wherein the controller is configured to identify incompatible devices based at least in part on a Dynamic Name System (DNS) query issued from one of the incompatible devices.

20. The autonomous system of claim 19 where the controllers configured to identify incompatible devices when the corresponding DNS query indicates one of an Internet Protocol (IP) version 6 (IPv6) address for a specified universal resource locator (URL) and the device issuing the DNS query is dependent on IP version 4 (IPv4).

21. A non-transitory computer-readable medium having a plurality of instructions, operable with a processor of a controller, sufficient to facilitate translation of Internet Protocol version 4 (IPv4) and Internet Protocol version 6 (IPv6) addresses within an autonomous system, the autonomous system including a plurality of network elements arranged at various edge locations to facilitate exchanging messages with a plurality of devices, the network elements being configured to translate between IPv4 and IPv6 addresses as a function of instructions received from the controller, the computer-readable medium comprising instructions sufficient for:
determining a first Domain Name System (DNS) query originating from a first device of the plurality of devices, the first device having been previously assigned a first IPv4 address;
determining a first DNS record for the first DNS query, the first DNS record indicating a first IPv6 address for a first server outside of the autonomous system;
determining a first network element closest to the first device;
determining a second network element closest to the first server;
associating a second IPv4 address with the first IPv6 address;
associating a second IPv6 address with the first IPv4 address;
instructing the first network element to translate an upstream traveling first message originating from the first device for transfer over the autonomous system to the first server, the first message having the first IPv4 address as a first source address and the second IPv4 address as a first destination address, such that the first source address becomes the second IPv6 address and the first destination address becomes the first IPv6 address;
instructing the second network element to translate a downstream traveling second message originating from the first server for transport over the autonomous system to the first device, the second message having the first IPv6 address as a second source address and the second IPv6 address as a second destination address, such that the second source address becomes the second IPv4 address and the second destination address becomes the first IPv4 address;
determining a second Domain Name System (DNS) query originating from the first device of the plurality of devices;
determining a second DNS record for the second DNS query, the second DNS record indicating a third IPv4 address for a second server outside of the autonomous system; and
instructing the first network element to relay an upstream traveling third message originating from the first device for transfer over the autonomous system to the second server without translation of the first and third IPv4 addresses, the second message having the first IPv4 address as a second source address and the third IPv4 address as a second destination address.

* * * * *